United States Patent [19]
Panwar

[11] Patent Number: 6,049,868
[45] Date of Patent: *Apr. 11, 2000

[54] APPARATUS FOR DELIVERING PRECISE TRAPS AND INTERRUPTS IN AN OUT-OF-ORDER PROCESSOR

[75] Inventor: Ramesh Panwar, Santa Clara, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/881,847

[22] Filed: Jun. 25, 1997

[51] Int. Cl.[7] .................................................. G06F 9/30
[52] U.S. Cl. ........................... 712/244; 712/218; 712/200
[58] Field of Search ................................ 395/591, 376, 395/394; 712/244, 218, 200

[56] References Cited

U.S. PATENT DOCUMENTS

| | | | |
|---|---|---|---|
| 5,134,561 | 7/1992 | Liptay ..................................... | 711/164 |
| 5,197,132 | 3/1993 | Steely, Jr. et al. ...................... | 395/376 |
| 5,197,138 | 3/1993 | Hobbs et al. ............................ | 712/222 |
| 5,487,156 | 1/1996 | Popescu et al. ......................... | 712/217 |
| 5,546,597 | 8/1996 | Martell et al. ........................... | 712/23 |
| 5,560,032 | 9/1996 | Nguyen et al. .......................... | 712/23 |
| 5,561,776 | 10/1996 | Popescu et al. ........................ | 712/239 |
| 5,625,837 | 4/1997 | Popescu et al. ......................... | 712/23 |
| 5,649,136 | 7/1997 | Shen et al. ............................... | 395/591 |
| 5,673,426 | 9/1997 | Shen et al. ............................... | 395/391 |
| 5,682,492 | 10/1997 | McFarland et al. ..................... | 712/214 |
| 5,734,910 | 3/1998 | Corrigan et al. ......................... | 395/734 |
| 5,751,985 | 5/1998 | Shen et al. ............................... | 395/394 |
| 5,764,971 | 6/1998 | Shang et al. ............................. | 712/244 |
| 5,778,211 | 7/1998 | Hohensee et al. ....................... | 395/500 |

*Primary Examiner*—Zarni Maung
*Assistant Examiner*—Saleh Najjar
*Attorney, Agent, or Firm*—William J. Kubida; James A. Pinto; Hogan & Hartson LLP

[57] ABSTRACT

In a processor executing instructions speculatively or out-of-order, an apparatus for tracking traps, exceptions, and interrupts within the processor. A table stores front-end and back-end traps associated with an instruction, and an instruction retirement module retires the instructions in order if no traps were associated with older instructions in the processor. In this way, the proper trap sequence of events is maintained so that traps can be properly handled.

14 Claims, 5 Drawing Sheets

APPARATUS FOR DELIVERING PRECISE TRAPS AND INTERRUPTS IN AN OUT-OF-ORDER PROCESSOR

CROSS-REFERENCES TO RELATED APPLICATIONS

The subject matter of the present application is related to that of co-pending U.S. patent application Ser. No. 08/881,958 identified as Docket No. P2345/37178.830071.000 for AN APPARATUS FOR HANDLING ALIASED FLOATING-POINT REGISTERS IN AN OUT-OF-ORDER PROCESSOR filed concurrently herewith by Ramesh Panwar now pending; Ser. No. 08/881,729 identified as Docket No. P2346/37178.830072.000 for APPARATUS FOR PRECISE ARCHITECTURAL UPDATE IN AN OUT-OF-ORDER PROCESSOR filed concurrently herewith by Ramesh Panwar and Arjun Prabhu now pending; Ser. No. 08/881,726 identified as Docket No. P2348/37178.830073.000 for AN APPARATUS FOR NON-INTRUSIVE CACHE FILLS AND HANDLING OF LOAD MISSES filed concurrently herewith by Ramesh Panwar and Ricky C. Hetherington now pending; Ser. No. 08/881,908 identified as Docket No. P2349/37178.830074.000 for AN APPARATUS FOR HANDLING COMPLEX INSTRUCTIONS IN AN OUT-OF-ORDER PROCESSOR filed concurrently herewith by Ramesh Panwar and Dani Y. Dakhil now pending; Ser. No. 08/882,173 identified as Docket No. P2350/37178.830075.000 for AN APPARATUS FOR ENFORCING TRUE DEPENDENCIES IN AN OUT-OF-ORDER PROCESSOR filed concurrently herewith by Ramesh Panwar and Dani Y. Dakhil now U.S. Pat. No. 5,898,853; Ser. No. 08/881,145 identified as Docket No. P2351/37178.830076.000 for APPARATUS FOR DYNAMICALLY RECONFIGURING A PROCESSOR filed concurrently herewith by Ramesh Panwar and Ricky C. Hetherington now pending; Ser. No. 08/881,732 identified as Docket No. P2353/37178.830077.000 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani now pending; Ser. No. 08/882,175 identified as Docket No. P2355/37178.830078.000 for SYSTEM FOR EFFICIENT IMPLEMENTATION OF MULTI-PORTED LOGIC FIFO STRUCTURES IN A PROCESSOR filed concurrently herewith by Ramesh Panwar now pending; Ser. No. 08/882,311 identified as Docket No. P2365/37178.830080.000 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington now pending; Ser. No. 08/881,731 identified as Docket No. P2369/37178.830081.000 for APPARATUS FOR TRACKING PIPELINE RESOURCES IN A SUPERSCALAR PROCESSOR filed concurrently herewith by Ramesh Panwar; Ser. No. 08/882,525 identified as Docket No. P2370/37178.830082.000 for AN APPARATUS FOR RESTRAINING OVER-EAGER LOAD BOOSTING IN AN OUT-OF-ORDER MACHINE filed concurrently herewith by Ramesh Panwar and Ricky C. Hetherington now pending; Ser. No. 08/882,220 identified as Docket No. P2371/37178.830083.000 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,728 identified as Docket No. P2398/37178.830085.000 for NON-BLOCKING HIERARCHICAL CACHE THROTTLE filed concurrently herewith by Ricky C. Hetherington and Thomas M. Wicki now pending; Ser. No. 08/881,727 identified as Docket No. P2406/37178.830086.000 for NON-THRASHABLE NON-BLOCKING HIERARCHICAL CACHE filed concurrently herewith by Ricky C. Hetherington, Sharad Mehrotra and Ramesh Panwar now pending; Ser. No. 08/881,065 identified as Docket No. P2408/37178.830087.000 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar now pending; and Ser. No. 08/882,613 identified as Docket No. P2434/37178.830088.000 for SYSTEM FOR THERMAL OVERLOAD DETECTION AND PREVENTION FOR AN INTEGRATED CIRCUIT PROCESSOR now pending filed concurrently herewith by Ricky C. Hetherington and Ramesh Panwar, the disclosures of which applications are herein incorporated by this reference.

BACKGROUND OF THE INVENTION

1. Field of the Invention

This invention relates in general to microprocessors, and more particularly, to microprocessor architectures and methods for delivering precise traps in a processor executing instructions speculatively or out-of-order.

2. Relevant Background

In order to improve the overall performance of a computer processor (also called a microprocessor), modern processor architectures utilize various performance enhancing techniques such as speculative instruction execution and out-of-order instruction processing.

Recent processor architectures use a branch prediction unit to predict the outcome of conditional branch instructions thereby allowing subsequent instructions to be fetched according to the predicted outcome. These instructions are "speculatively" executed to allow the processor to make forward progress during the time the branch instruction is resolved. When the prediction is correct, the results of the speculative execution can be used as correct results, greatly improving processor speed and efficiency. When the prediction is incorrect, the completely or partially executed instructions must be flushed from the processor and execution of the correct branch initiated.

Conventional processors also execute instructions in an order determined by the compiled machine language program running on the processor and so are referred to as "in order" or "sequential" processors. In superscalar processors, multiple pipelines can simultaneously process instructions "out-of-order" where the instructions are processed in parallel in any efficient order, as long as there are no dependencies between instructions.

Although speculative execution and out-of-order processing greatly improve the performance of a processor, these techniques also increase the complexity of the processor as compared to simple sequential processors. One area of increased complexity relates to the handling of traps related to the processing of an instruction. When an error occurs in the execution of an instruction, a "trap" or "exception" is generated. These events require proper handling by invoking software or hardware instruction routines called "trap handlers."

In particular, speculative execution of instructions makes handling of traps difficult since an older instruction may initiate a trap after a younger instruction has been executed. Also, a trap can occur based on an instruction which is part of a mispredicted branch of instructions which should not have been executed.

What is needed is an apparatus and method for handling precise traps in a processor using speculative and out-of-order instruction execution.

SUMMARY OF THE INVENTION

The above problems have been solved by an apparatus and method for handling traps in a processor executing instructions speculatively or out-of-order. The central apparatus for handling traps in the present invention is called the instruction retirement window. This window contains the trap status of all the live instructions in the processor. Traps are categorized into two broad categories: front-end traps (pre-execution traps) and back-end traps (post-execution traps).

As an instruction flows down the pipeline into the instruction scheduling window, any front-end traps for the instruction are collected and forwarded with the instruction. The instruction makes an entry into the instruction scheduling window for execution, and the front-end trap status of the instruction is entered into the instruction retirement window.

When the instruction is issued for execution, the instruction carries with it an index for its entry into the instruction retirement window so that any post-execution traps can also be entered into the instruction retirement window. When the instruction finishes execution on any of the execution units, the back-end trap status of the instruction is relayed back to the appropriate entry in the instruction retirement window. A retirement module, associated with the instruction retirement window, then processes the instructions in the order in which they were fetched and invokes the appropriate trap handler upon discovery of the trap status in the window.

In an apparatus implementation of the invention, a processor is disclosed having an instruction fetch unit for fetching instructions for processing, an instruction scheduling unit receiving the instructions and issuing them for execution. Further, an execution unit receives the issued instructions and executes one or more of the instructions speculatively or out-of-order. The processor has a table for storing instruction trap information, the table having one or more entries specifying a trap vector relating to the instructions. A retirement module of the processor retires each of the instructions upon completion of execution, and the retirement module signals a trap responsive to the instruction trap information.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

Disclosed herein is an apparatus and method for tracking traps related to or generated by an instruction operating within a processor. As used herein, the term "trap" means a vectored transfer of control of the normal execution of a program, such as from a trap, interrupt, or exception, to a trap handler. In response to a trap, the processor generally changes the instruction flow to load and process instructions from the trap handler. A trap behaves like an unexpected procedure call in that it causes the hardware to save certain processor state registers and begin execution of the trap handler code in the trap vector.

Figure 1:
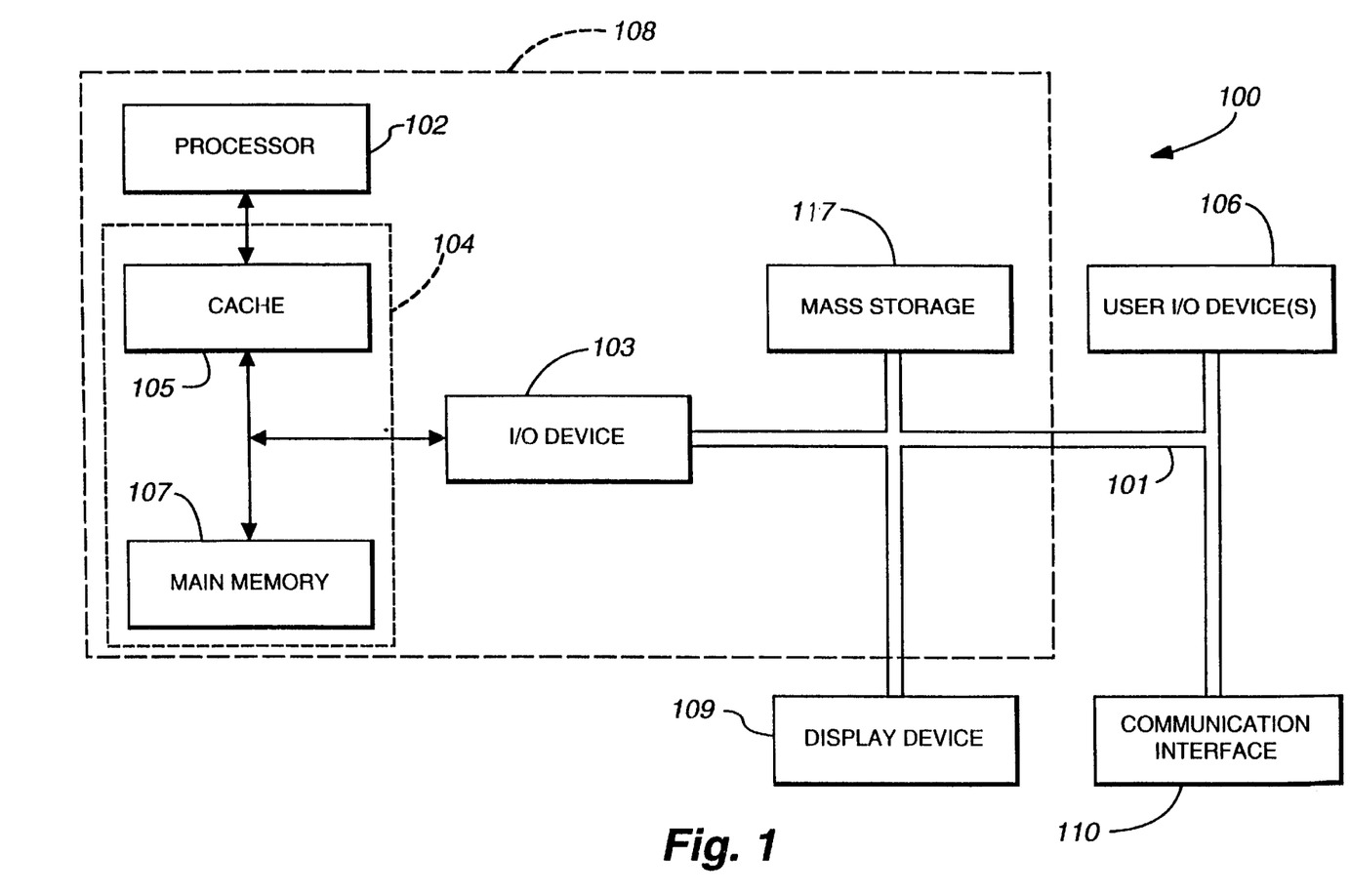
FIG. 1 shows in block diagram form a computer in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
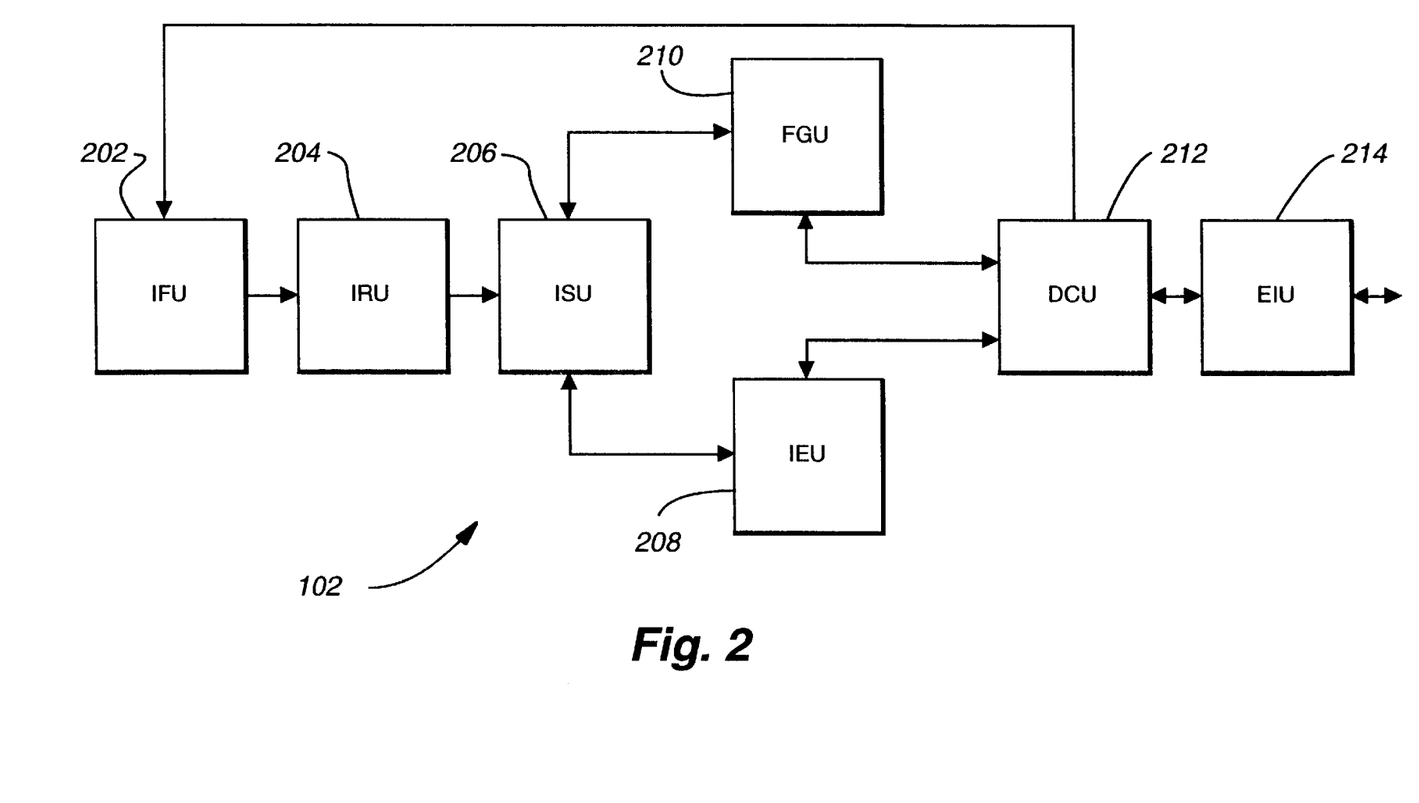
FIG. 2 shows a processor in block diagram in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the LI cache dedicated to data storage. IFU 202 fetches one or more instructions at a time by appropriately addressing the instruction cache. The instruction cache feeds addressed instructions to instruction rename unit (IRU) 204. Preferably, IFU 202 fetches multiple instructions each cycle and in a specific example fetches eight instructions each cycle—known as an instruction bundle. Any number of instructions may be included in a bundle to meet the needs of a particular application.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has fetched from the instruction cache, but has not yet completed or been retired. IRU 204 outputs renamed instructions to instruction scheduling unit (ISU) 206.

ISU 206 receives renamed instructions from IRU 204 and registers them for execution. ISU 206 is operative to schedule and dispatch instructions as soon as their dependencies have been satisfied into an appropriate execution unit (e.g., integer execution unit (IEU) 208, or floating-point and graphics unit (FGU) 210).

In accordance with the present invention, ISU 206 also maintains trap status of live instructions in an instruction retirement window, discussed below. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all instructions from which it depends have completed. Upon retirement the instruction's result is written into the appropriate register file and is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double-precision architectural registers as well as single and/or double-precision rename registers.

The floating point graphics and execution unit FGU 210 includes one or more pipelines, each comprising one or more stages that implement floating-point instructions. FGU 210 also includes mechanisms for holding the results and state of speculatively executed floating-point and graphic instructions. FGU 210 functions to perform final decoding of floating-point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating-point unit (FPU) in designs in which special purpose graphic and multimedia instructions are not used. FGU 210 preferably includes mechanisms to access single and/or double-precision architectural registers as well as single and/or double-precision rename registers.

A data cache memory unit (DCU) 212, including cache memory 105 shown in FIG. 1, functions to cache memory reads from off-chip memory through external interface unit (EIU) 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes.

The apparatus and method for handling trap status in accordance with the present invention is implemented primarily in the instruction scheduling unit ISU 206. In accordance with the present invention, traps are categorized into two categories. Front-end traps are traps which occur relating to an instruction where the trapping event or condition occurred prior to the execution of the instruction. Examples of front-end traps include an instruction TLB miss (i.e., when the TLB does not have an entry for the current access request), an instruction access fault, a register window overflow, or a register window underflow.

Back-end traps are traps related to an instruction which occur during or after the execution of the instruction, generally as a result of the execution of the instruction within one of the processor's execution units.

In accordance with the present invention, an instruction retirement window is provided in the instruction scheduling unit 206. The instruction retirement window contains information about the trap status of each live instruction in the machine. This trap status information includes any front-end traps and any back-end traps associated with the instruction. If an instruction in the instruction retirement window has a trap associated with it (either a front-end or a back-end trap), subsequent live instructions are flushed from the machine if they are younger than the instruction which generated the trap, and the appropriate trap handler is invoked.

Furthermore, a retirement module in ISU 206 retires executed instructions when completed by the IEU 206 or FGU 210 in the same order in which the instructions were originally fetched (i.e., an instruction is retired when it has finished execution and all other older instructions have retired). When an instruction has completed and is retired, the retirement module performs the appropriate updates to architectural register files, condition code registers, and the like. The instruction's result is written into the appropriate register file and is no longer deemed a "live" instruction. The retirement module is responsive to the trap conditions and discards or flushes operations being performed on instructions subsequent to an instruction generating a trap in the program order.

In addition, upon detection of a mispredicted branch, instructions from a mispredicted branch are removed from the processor, and the IFU 202 is redirected to fetch the correct branch.

Figure 3:
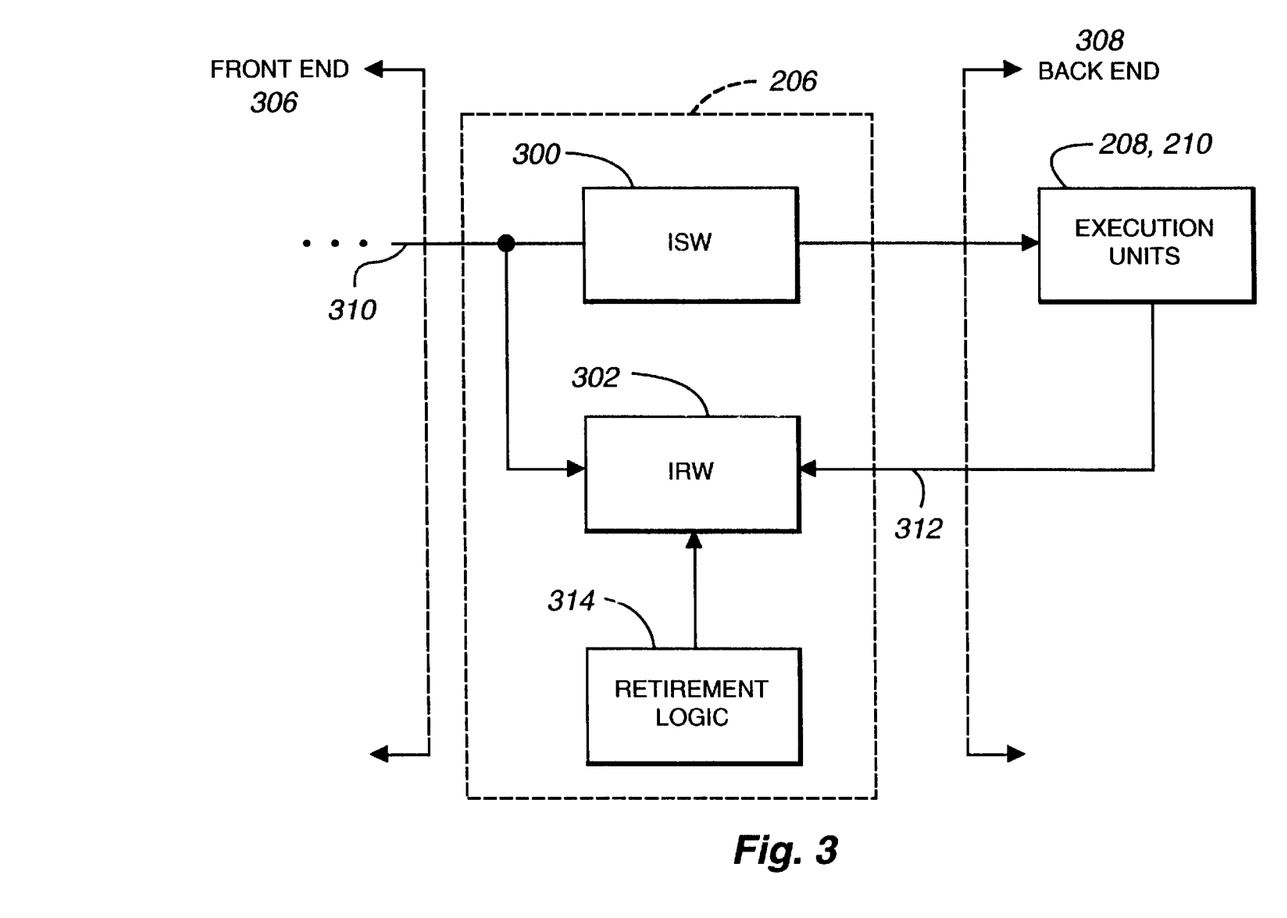
FIG. 3 shows a block diagram of the instruction scheduling unit 206 having an instruction scheduling window 300 and an instruction retirement window 302, in accordance with the present invention.

Referring to FIG. 3, an embodiment of the present invention is shown wherein the instruction scheduling unit 206 has an instruction scheduling window (ISW) 300 and an instruction retirement window (IRW) 302. The IRW 302 receives trap information both from the processor's front-end 306 along path 310, and from the back-end 308 along path 312.

ISU 206 is coupled to the front-end 306 of the processor through path 310. As an instruction is passed to ISU 206, an entry for the instruction is made in the instruction scheduling window 300 and the instruction retirement window 302. The information relating to the instruction passed to the back-end of the processor includes the instruction ID, the instruction's op-code, and the registers associated with the instruction.

The ISW 300 is used for scheduling instructions in their proper order if dependencies exist between instructions. In a specific embodiment, ISW 300 includes a slot for every live instruction within the processor. Dependency information about the instruction is encoded within each entry. Other information such as the ready status and latency information of the instruction may also be included within the ISW for each entry. The ISU 206 passes instructions to the back-end 308 of the processor for execution by either the integer execution unit 208 or the floating point graphics and execution unit 210. As mentioned above, any traps originated during and after the execution of the instruction in the back-end 308 of the processor are treated as "back-end" traps.

Upon execution, the instruction ID and the back-end trap status vector are passed from the back-end of the processor into the ISU 206. This information is then stored within the IRW 302, described below.

Retirement module or logic 314 accesses IRW 302 for retiring instructions. Module 314 will not retire a speculatively executed instruction unless the conditional branch of the instruction has been confirmed. Further, as will be explained below, module 314 will not retire a younger instruction if an older instruction has generated a trap, thereby ensuring the appearance of proper program order even though the younger instruction may have been executed prior to the older instruction.

Figure 4:
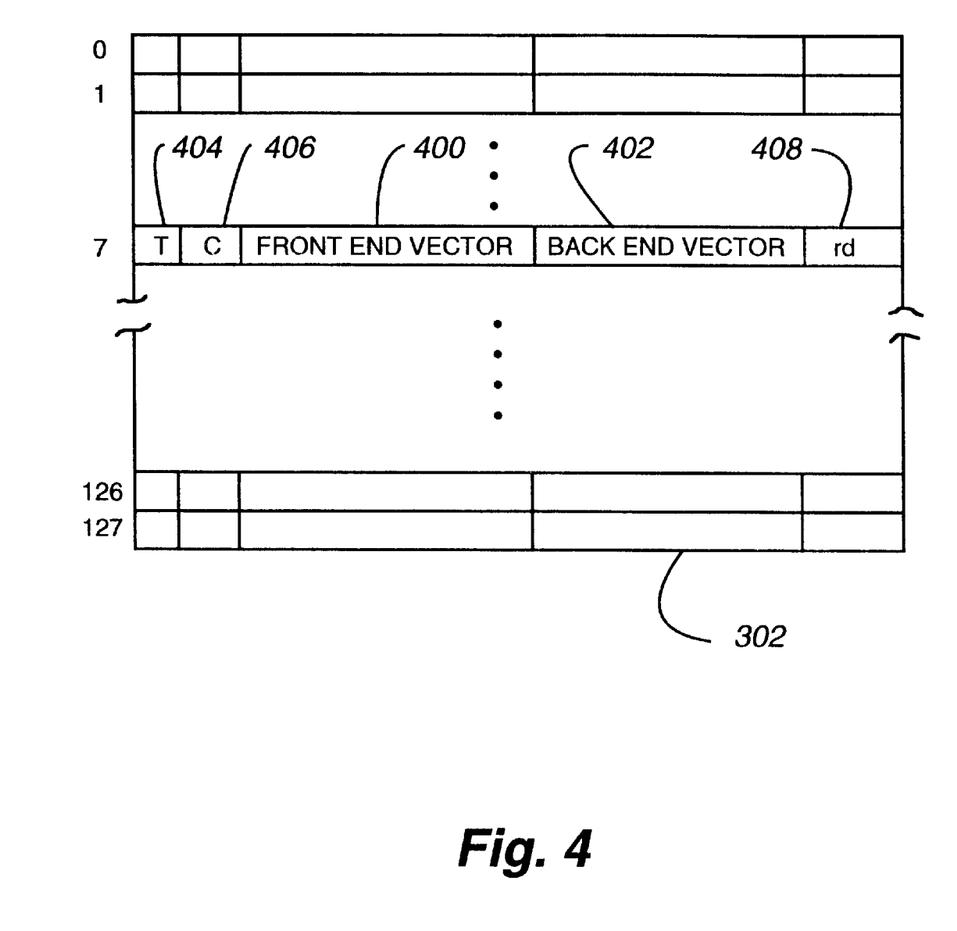
FIG. 4 shows an embodiment of the instruction retirement window 302 for maintaining trap status of an instruction.

FIG. 4 illustrates one embodiment of the instruction retirement window IRW 302 in accordance with the present invention. IRW 302 has, in one embodiment, the same number of entries as ISW 300, corresponding to the total number of live instructions operating within the processor.

Each entry in IRW 302 has trap information relating to the live instructions within the processor. Front-end vector 400 is the trap vector or address of the front-end trap, if any, associated with the instruction. Back-end vector 402 is the trap vector or address for the back-end trap, if any, associated with the instruction. Additional information can also be associated with the trap status of the instruction. Trap field 404 indicates the existence of either a front-end or back-end trap. In one implementation, trap field 404 can be a single bit or flag indicating that the instruction associated with the entry has a trap needing servicing. Trap field 404, however, is optional since the existence of a trap vector 400 or 402 also indicate the existence of a trap associated with the instruction.

A completion bit field 406 is provided to indicate the instruction has completed execution. The completion bit 406 is used by the retirement logic so that instructions in the retirement window can be retired in an orderly manner.

Destination register field 408 is an optional field that can be provided within IRW 302. The destination register field 408 can be used by the retirement logic for updating the proper architecture register corresponding to the destination register specified in field 408 upon retirement of the instruction.

While FIG. 4 illustrates two trap vectors, it will be understood that more than two trap vectors can be equivalently used if deemed appropriate. Further, if there are two or more traps generated by a single instruction, the higher priority trap will be initiated by the retirement logic or otherwise in the processor.

The operations of the retirement module or logic 314 (FIG. 3) with respect to handling of traps will now be discussed. In general, the retirement logic retires instructions in order (i.e., in the same program order as the instructions were fetched from the instruction cache). Assuming an instruction has executed and generated either a front-end or back-end trap, when the retirement logic comes across an entry in IRW 302 which has the T-bit 404 and the C-bit 406 set, these bits indicate that the instruction has completed and that a trap is associated with the instruction. The retirement Logic 314 examines the trap vector associated with the instruction. If instructions older than the trap-inducing instruction have been retired, the retirement logic then retires the trap-inducing instruction, and invokes the appropriate trap handler. The retirement logic then directs the processor to be "flushed" which clears the younger existing live entries in ISW 300 and IRW 302 and other locations in the processor. Therefore, the younger instructions which were scheduled after the trap-inducing instruction would need to be re-fetched and re-executed upon completion of the trap handler.

In this manner, even though the trap-inducing instruction may have been executed after a subsequent instruction (i.e., an older instruction generated a trap after a younger instruction was executed) due to out-of-order or speculative execution, the proper sequence of trapping events is preserved and the younger instructions are flushed from the processor appropriately. In this way, proper program execution order is maintained.

Figure 5:
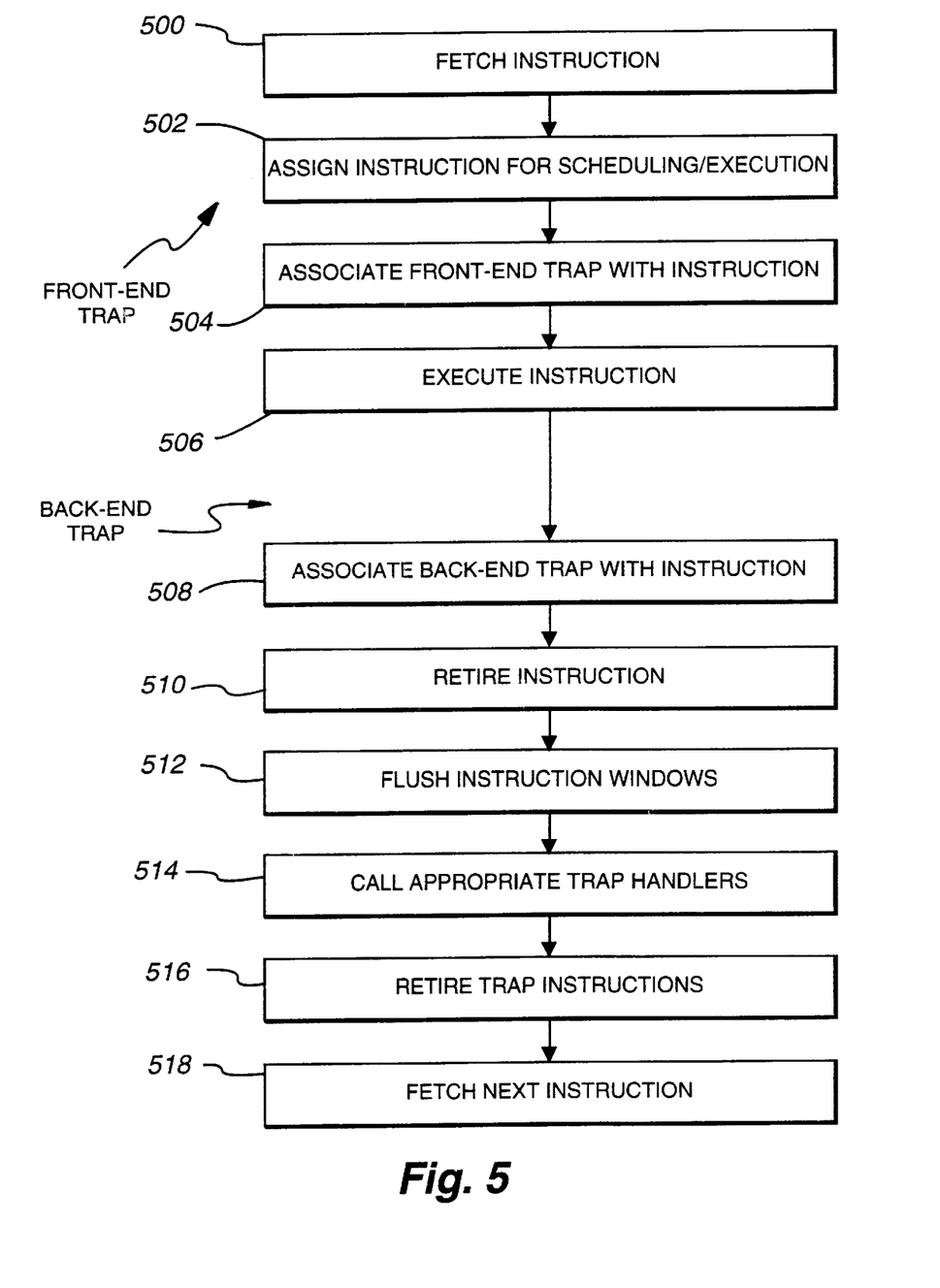
FIG. 5 shows a flow diagram of an embodiment of the invention for tracking traps invoked by an instruction.

FIG. 5 illustrates an embodiment of a method in accordance with the present invention for ensuring precise traps. Operation 500 fetches a first instruction from an instruction cache. A front-end trap may possibly be associated with this operation if the instruction is not found in its expected location (i.e., an instruction TLB miss). Operation 502 assigns the instruction for scheduling and execution. As shown with reference to FIGS. 2 and 3, the instruction scheduling unit 206 can perform operation 502 by assigning a slot for the instruction in instruction scheduling window 300, in one embodiment of the invention. Operation 504 associates any front-end traps with the instruction. As previously discussed, operation 504, in one embodiment of the invention, stores the front-end trap status in the instruction retirement window 302 for later processing. The instruction is then executed at operation 506. Any back-end traps which are generated during or after the execution of the instruction are then associated with the instruction by operation 508. Again, this association can be made in one embodiment of the invention by placing the back-end trap vector in the IRW 302 associated with the instruction.

The instruction which induced the trap is then retired by operation 510 if all older instructions have been retired. During retirement, the results for that instruction are transferred to the architectural result registers for the instruction and the processing of the instruction is complete. Operation 512 then flushes the instruction windows, including ISW 300 and IRW 302, if the instruction retired by operation 510 generated any front-end or back-end traps. Operation 514 initiates the appropriate trap handlers to service the trap initiated during the processing of the instruction. In one embodiment of the invention, the ISU 206 redirects the IFU 202 to begin fetching instructions from the appropriate trap handler.

The instructions corresponding to the trap handler fetched by operation 514 are then processed within the processor. When the trap handler is completed, operation 516 retires the trap handler instructions, thereby updating the architectural registers in the machine. At this point, the trap initiated by the offending instruction has been fully serviced. Operation 518 then fetches the next instruction in the program for normal processing within the processor. This instruction may have previously been fetched and entered into the instruction scheduling window and the instruction retirement window, but was flushed by operation 512 upon the retirement of the trap-inducing instruction. In this manner, the present invention ensures that the trap-inducing instructions are retired, and the appropriate trap handlers are completed, before a next program instruction is retired. The present invention therefore ensures proper program order operation, even though the individual instructions may be executed speculatively or out-of-order within the execution units of the processor.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

While the invention has been particularly shown and described with reference to a preferred embodiment thereof, it will be understood by those skilled in the art that various other changes in the form and details may be made without departing from the spirit and scope of the invention. For instance, while the present invention has been described with reference to a processor architecture shown in FIG. 2, it will be understood that the present invention could be used in other equivalent processor designs.

What is claimed is:

1. A processor, comprising:
    an instruction fetch unit for fetching instructions for processing;
    an instruction scheduling unit receiving said instructions and issuing said instructions for execution;
    an execution unit receiving said issued instructions and executing one or more of said instructions;
    a table for storing instruction trap information, said table having one or more entries, each entry adapted to specify one or more trap vectors relating to a trap condition of one of said instructions, said one or more trap vectors including a front-end trap created before said instruction is executed, and a back-end trap created during or after said one instruction is executed; and
    a retirement module for retiring each of said instructions upon completion of execution and for determining when a trap handler should be initiated in said processor, said retirement module signaling that the trap handler should be initiated responsive to said instruction trap information to correct said trap condition, said retirement module also determining whether instructions older than a trap-inducing instruction have been retired, and if so, flushing from the processor any instructions younger than said trap-inducing instruction.

2. The processor of claim 1, wherein said execution unit executes said issued instructions out-of-program order.

3. The processor of claim 1, wherein said retirement module retires said instructions according to program order.

4. The processor of claim 1, wherein each entry in said table has a field indicating said instruction completed execution in said execution unit.

5. The processor of claim 1, wherein each entry in said table has a field indicating said instruction has a trap vector associated therewith.

6. The processor of claim 1, wherein said retirement module is coupled to said fetch unit to communicate said trap vector from said instruction trap information in said table to said fetch unit.

7. The processor of claim 6, wherein said retirement module initiates a flush of live instructions after retiring said instruction.

8. The processor of claim 7, wherein said retirement logic initiates a trap handler responsive to said instruction trap information.

9. A computer system comprising:

a memory system;

a processor coupled to said memory system, the processor comprising:

an instruction fetch unit for fetching instructions for processing;

an instruction scheduling unit receiving said instructions and issuing said instructions for execution;

an execution unit receiving said issued instructions and executing one or more of said instructions;

a table for storing instruction trap information, said table having one or more entries, each entry adapted to specify one or more trap vectors relating to a trap condition of one of said instructions, said one or more trap vectors including a front-end trap created before said instruction is executed, and a back-end trap created during or after said one instruction is executed; and a retirement module for retiring each of said instructions upon completion of execution and for determining when a trap handler should be initiated in said processor, said retirement module signaling that the trap handler should be initiated responsive to said instruction trap information to correct said trap condition, said retirement module also determining whether instructions older than a trap-inducing instruction have been retired, and if so, flushing from the processor any instructions younger than said trap-inducing instruction.

10. The computer system of claim 9, wherein said execution unit executes said issued instructions out-of-program order.

11. The computer system of claim 9, wherein said retirement module retires said instructions according to program order.

12. The computer system of claim 9, wherein each entry in said table has a field indicating said instruction completed execution in said execution unit.

13. The computer system of claim 9, wherein each entry in said table has a field indicating said instruction has a trap vector associated therewith.

14. The computer system of claim 9, wherein said retirement module is coupled to said fetch unit to communicate said trap vector from said instruction trap information in said table to said fetch unit.

* * * * *